(12) United States Patent
Roch et al.

(10) Patent No.: US 6,314,376 B1
(45) Date of Patent: Nov. 6, 2001

(54) METHOD AND DEVICE FOR CHECKING THE SOLIDITY OF ANCHORED STANDING MASTS

(76) Inventors: Mathias Roch, Staunsfeld 13, D-23923 Herrnburg; Oliver Roch, Hohenhorst-Nord 6, D-23623 Ahrensbök, both of (DE)

( * ) Notice: Subject to any disclaimer, the term of this patent is extended or adjusted under 35 U.S.C. 154(b) by 0 days.

(21) Appl. No.: 09/180,703
(22) PCT Filed: Dec. 4, 1996
(86) PCT No.: PCT/DE96/02319
§ 371 Date: Nov. 13, 1998
§ 102(e) Date: Nov. 13, 1998
(87) PCT Pub. No.: WO98/25117
PCT Pub. Date: Jun. 11, 1998

(51) Int. Cl.[7] ............................... G01N 3/00; G01N 3/20
(52) U.S. Cl. .................... 702/41; 73/786; 73/796
(58) Field of Search ................................. 702/41, 42, 43, 702/44, 33–36; 73/786, 796, 788, 849, 812, 852, 789

(56) References Cited

U.S. PATENT DOCUMENTS

| 4,343,179 | 8/1982 | Astrom . |
| 4,350,044 | 9/1982 | Richardson . |
| 4,926,691 | 5/1990 | Franklin . |
| 5,212,654 | 5/1993 | Deuar . |
| 6,055,866 | 5/2000 | Roch . |

FOREIGN PATENT DOCUMENTS 26907045 4/1996 (DE) .

*Primary Examiner*—Marc S. Hoff
*Assistant Examiner*—Hien Vo
(74) *Attorney, Agent, or Firm*—Jacox, Meckstroth & Jenkins (57) ABSTRACT

According to the method suggested, the mast is submitted to an increasing force, and both this force and the deflection path are correlated to establish a characteristic load line. After it has been loaded, the mast is again relieved from the load, a characteristic load relief line is determined and the return force is correlated to the decreasing return path. The finds related to the mast solidity and anchorage are based on the tracing of the characteristic load relief line and the comparison with the characteristic load line.

29 Claims, 6 Drawing Sheets

$f1 \hat{=} f2 \hat{=} f3 \hat{=} f4 \;/\; C1 \hat{=} C2 \hat{=} C4 \hat{=} C3$

Fig. 5

$f1 \hat{=} f2, f3 \neq f4$
$C2 \hat{=} C4 \hat{=} C1$

Fig. 6

$f1 \neq f2, f2 \hat{=} f4, f3 \neq f4 \;/\; C2 \hat{=} C4$

Fig.7

$f1 \hat{=} f2, f3 \hat{=} f4 / C2 \ne C4$

Fig.8

$f1 \hat{=} f2, f2 \ne f4, f3 \ne f4 / C2 \ne C4$

METHOD AND DEVICE FOR CHECKING THE SOLIDITY OF ANCHORED STANDING MASTS

BACKGROUND OF THE INVENTION

The invention relates to a method for testing the solidity of vertically anchored masts. Furthermore the invention relates in particular to a device suitable for carrying out this method.

In the U.S. Pat. No. 5,212,654 methods for a destruction-free testing of masts with regard to their remaining solidity are described in order to still determine the loading still possible on the mast before this could break. If it is determined that the remaining solidity and thus the life-expectancy to be expected are too small, the mast concerned must be exchanged.

With these known methods for example it is proceeded such that the mast above it anchoring is loaded with a fixed predetermined force which corresponds to the previously calculated allowable residual solidity. If the lateral deflection of the mast after the force has reached the predetermined value is ascertained to be excessively high, this is a criterion for damage to the mast and the necessary exchange.

One also arrives at a suitable result when a previously calculated deflection corresponding to the theoretical residual solidity is predetermined and then the mast is loaded with a force from the side which increases until the deflection is achieved. If the force measured at the end of the testing procedure is ascertained to be excessively small then an exchange of the mast is to be carried out since with a damage-free and less elastic mast the force for reaching the fixed deflection would be comparatively larger.

Finally in the previously mentioned patent there is yet suggested a testing method with which the mast is loaded with a continuously measured force and simultaneously the lateral mast deflection is measured in order from these values at the end of the testing procedure to compute the residual solidity of the mast With this method no provisions are made for the case that a damaged mast with increasing loading forces and bending moments makes a transition from the region of elastic deformation into a plastic deformation, thus could even buckle or break without this being able to be previously recognized and the test being stoped by releasing the mast loading. Inasmuch as this is concerned for this case it is only foreseen to support the mast with a frame or with cables, chains or likewise or to secure the mast loosely to a crane so that on buckling or breakage of the mast no damage may arise.

Furthermore the mast is still secured below, above its anchoring with a lock-nut so that the mast or its anchoring is fixed in tile ground against shifting. This however has the result that in the testing of the mast only the mast part which is located freely above the anchoring or the ground may be included and no details are possible as to the question whether or possibly the other part of the mast could be damaged or whether the mast at all is sufficiently stable.

In EP 0 638 794 A1 there is described a method for testing the solidity and bending resistance of a vertically anchored mast with which the mast likewise is subjected to a variable bending moment in that it is loaded with a force introduced above its anchoring and increasing in the course of the testing procedure, the measured value and the course of the force being used to determine the solidity of the mast. The mentioned force as well as also the distance about which the mast is laterally deflected at a selected location on account of the bending moment are measured simultaneously with sensors.

A linear dependency of the measured distance on the introduced force is evaluated as information of a mast deflection lying in the region of elastic deformation, whilst the determining of a non-linear dependency of the values measured by the sensors are evaluated as information of a plastic deformation and/or for a non-stable anchoring of the mast which is then recognized as not having bending resistance or is not stable and the testing procedure is stopped by unloading the mast. Thus with this method no safety precautions are to be made for the case that is not to be exected, specifically that the mast with this testing step may buckle or break. Moreover the testing procedure is only broken off by unloading the mast when a predetermined nominal value of the bending momemnt is achieved in the elastic region of deformation, which means that the mast is sufficiently stable and has bending resistance and does not need to be exchanged for another.

With all previously mentioned methods it is not possible to determine whether the mast tested in each case, in spite of deformation lying in the elastic region until reaching the testing load, is damaged by a fracture or by a corrosion region possibly going through the mast, so that in the case of such damage one may possibly arrive at an erroneous evaluation of the remaining stability of the mast, since for example with the application of the method according to EP 0 638 794 A1 a linear course of the function f=F(S), wherein F is the introduced force and S the lateral deflection of the mast, or a changing bending angle of the mast may give the delusion that the mast is not damaged.

This problem is solved by the method described in the Utility Model DE 296 07 045 U in which by way of a force unit the mast above its anchoring in the same plane of testing is loaded from the side, after one another with a compression force and with a tensile force, thus with oppositely directed bending moments so that for both cases of loading there results two functions $f_x$ and $f_y$ and these can be processed in an evaluation unit and compared. Furthermore these functions are usefully displayed on a monitor and/or graphically represented with a printer for the simultaneous assessment or subsequent evaluation.

These functions with an assumed straight course particularly give much information inasmuch as they give information whether there is damage caused for example by a fracture in the mast and where this damage is located.

If both functions $f_x$, $f_y$ have the same course and thus the same gradient, it may be concluded that in any case no damage of the mast in the vertical testing plane and in the mast region directly next to this plane will be present. If on the other hand the courses of the two functions $f_x$, $f_y$ related to the same zero point diverge and thus have differing gradients then a mast damage may be concluded even when the characteristic curves obtained from the two functions run linearly or straight, since a mast for example damaged with a fracture even after a further development of the fracture with an increasing loading of the mast will continue to behave elastically and a fracture formation at the most would result in a small kink in the otherwise continued linearly running characteristic curve.

As has already been mentioned, from the two functions obtained in the same testing plane and from their courses also the location of the damage may be concluded. If specifically e.g. the function $f_x$ evaluated with the compression procedure has a larger gradient than the function $f_y$ determined with the tensile procedure, this would mean that the fracture is located on the side of the mast on which the tensile force is indroduced, since it is to be expected that the mast on account of the smaller spreading of a transversly running fracture, without this at the same time having to become larger, will behave more elastically than with a compression force introduced in the opposite direction with which oppositely lying fracture surfaces are pressed together and the mast with this loading direction will behave less elastically as one without a fracture formation. In this context the same applies when the fracture would run vertically or with a vertical component, in the mast. On account of further criteria for assessing a mast to be tested the solutions specified in the Utility Model DE 296 07 045.9U are referred to, from which the invention also proceeds and of which the invention makes use.

All previously dealt with methods have the common disadvantage that with them the condition that the mast or its anchoring with the respective loading cases may change its position in or on the ground may not be exactly taken into account. In any case it may happen that with the testing procedures it may for example arise that movements and a tilting shifting of the mast or its anchoring may occur on or in the ground and at the same time ground material is permanently displaced by the tilting of the mast or its anchoring, which of course would have an such effect on the course of the functions f that these would no longer give clear information on the stability of the mast as such.

BRIEF SUMMARY OF THE INVENTION

In particular this disadvantage is to be alleviated by the invention in that a method and a testing device are put forward with which in a relatively simple and above all secure manner a sound decision and answer to the question can be achieved as to whether on the one hand a tested mast is adequately stable and whether oil the other hand the obtained measuring results may point to whether a shifting of the mast or its anchoring in the ground is present, wherein even on ascertaining such shifting, information is to be made possible whether the mast is damaged or not.

In one aspect this invention comprises a method for testing the stability of a vertically anchored mast with which the mast is loaded with an increasing force F1 introduced above its anchoring, wherein this force and the measure S1 about which the mast on account of the force effect is laterally deflected in one direction where appropriate are acquired and there results a function f1=F1(S1), and with which the mast after completion of the loading procedure is again unloaded, wherein the restoring force F2 of the mast, reducing with the unloading procedure is acquired in dependency on the reducing lateral deflection S2 as a restoring movement, wherein there results a function f2=F2(S2), and therein by way of the course of the function f2 and of a further function (f1;f4) information on the stability of the mast and its anchoring is obtained.

In other aspect this invention comprises a method in which the mast after a first testing procedure in the same testing plane with a second testing procedure is loaded with a force F3 directed oppositely to the force F1 and this force as well as the lateral deflection S3 of the mast resulting with the second testing procedure are acquired, wherein there results function f3=F3(S3), wherein also in the second testing procedure an unloading of the mast is included in that the restoring force F4 resulting with this unloading and the reducing deflection S4 of the mast are acquired, wherein there results a function f4=F4(S4), wherein with the first and second testing procedure in the case of not reaching the maximum test force (Fpmax) the course and the end values of loading characteristic curves (50,52) as well as the residual deflections (S2,S4) of evaluated unloading characteristic curves (51,53) are acquired and evaluated for determining the type of damage to the mast.

With the solution according to the method according to the invention it is even possible also to acquire the condition of the anchoring of the mast in the ground on testing the system mast/anchoring when the system has been subjected to the maximum test force. It becomes evidently recognisable whether the anchoring has behaved solidly or stably, i.e. whether the anchoring has resisted all forces acting on it and accordingly has not moved or whether on reaching the maximum testing force it has also given, thus has moved and as a rule has carried out a tilting movement. Indeed there are situations in practice where it is not neccesarily recognisable on the anchoring itself and/or on the ground surroundings of the anchoring whether a tilting movement and thus a tilting shifting of the anchoring has taken place during the testing procedure. Further it is recognisable whether with the tilting shifting of the mast and its anchoring, damage to the mast is present or not. Moreover it can also be recognized whether, with the anchoring which has remained solid, damage to the mast is present or not.

As essential reason for obtaining assessment characteristic curves giving information on testing the system mast/anchoring, apart from the recording of the respective loading characteristic curve, according to the invention also lies in the recording of the respective associated unloading characteristic curve. If with the test it is ascertained that the concerned evaluated unloading characteristic curve has a course deviating from its associated loading characteristic curve, thus for example has not returned to the zero point of the loading characteristic curve, then there is present at least one tilting shifting of the mast anchoring. If it is ascertained that the curve pair of the loading characteristic curve and unloading characteristic curve is identical up to the maximum test load, that therefore the unloading characteristics curve has the same steep course as the loading characteristic curve and returns to the zero point of the loading characteristic curve, then it is certain that the mast as well as its anchoring are in order. Furthermore it may also be ascertained that the mast is in order in spite of an ascertained tilting shifting of its anchoring.

Since it has been surprisingly ascertained that the unloading characteristic curve, which in the recorded force-deflection diagram runs back from its maximum test force applied in the region of elastic deformation until the test force is removed, represents a straight line, with a comparison of the unloading characteristic curve in each case with its associated loading characteristic curve or of the unloading characteristic curves amongst each other it can be recognized whether the mast alone and/or its anchoring is damaged or not, and specifically with the inclusion of the mast anchoring up to reaching the maximum test load. The mast anchoring is thus usually included with the testing method according to the invention and not isolated from the mast. The method according to the invention with respect to the previously known methods therefore permits in a simple manner increased information on the tested system of the mast and its anchoring.

For a further improvement of information capability on the damage to the mast and its anchoring the test loads applied directly to the mast for determining the loading characteristic curves and the unloading characteristic curves for each testing plane are applied in two opposite directions.

This means for each testing plane a compression loading in the one direction and a tensile loading in the opposite direction. One thus obtains four characteristic curves, and from a comparison of these loading characteristic curves and unloading characteristic curves to one another there results even more exact information on tile damage or lack of damage to the mast and/or its anchoring. The information capability may be increased even further when a multitude of testing planes are applied, in particular when at the same time for each plane it is tested in two opposite directions.

A device for carrying out the method according to the invention comprises an evaluation unit which is equipped with means for determining an unloading curve belonging to the evaluated loading curve corresponding to the function f1, this unloading curve representing a function f2 from the restoring values measured by the force and distance sensor. This means may consist of a computer which functions according to a suitable program In a preferred formation the evaluation unit may be provided with means for comparing the courses of the functions f1 and f2 for the purpose of ascertaining a deviation of the two curves from one another as a criterion for damage to the mast and/or to its anchoring. These means may consist of electrical comparator circuits.

The measuring results of the testing procedure, i.e. the courses of the loading characteristic curves and the unloading characteristic curves according, to the functions f1 and f2 respectively may be displayed optically on a monitor and/or may be documented with a printer. Such a device is simple in its construction and is therefore inexpensive to manufacture as well as simple to handle.

Preferred formations of the invention are specified in the dependent claims.

BRIEF DESCRIPTION OF THE DRAWINGS

The invention is hereinafter described in more detail with an embodiment example shown in the appended drawings. There are shown.

DETAILED DESCRIPTION OF THE INVENTION

Figure 1:
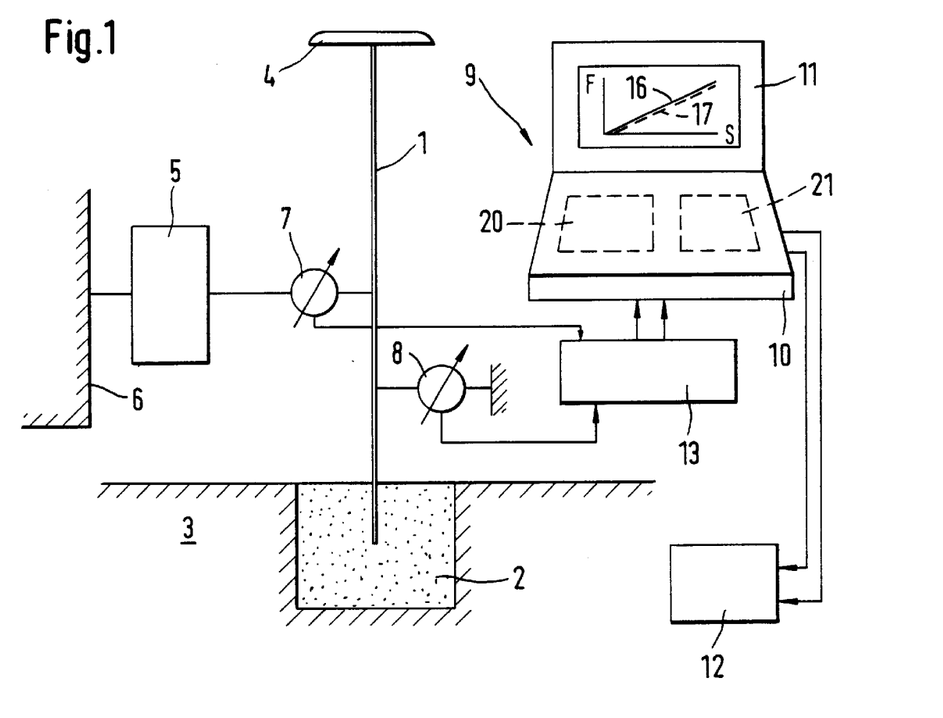
FIG. 1 a schematic and heavily simplified construction of a device in combination with a mast to be checked therewith and its anchoring, FIG. 2 testing procedures on a mast and its anchoring with the device according to FIG. 1, FIG. 3 the system of the mast and its anchoring in a perfect, and in a displaced condition, FIGS. 4 to 13 diagrams which show loading and unloading characteristic curves with a mast including its anchoring, tested within one plane in two opposite directions.
Figure 2:
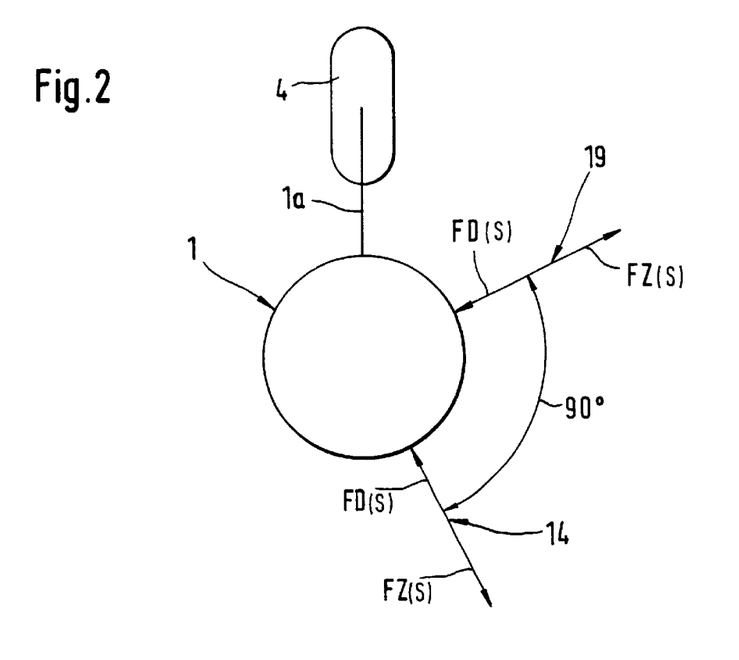

According to the FIGS. 1 and 2 a mast 1 is fastened vertically in the ground 3 by way of an anchoring 2. The mast 1 is for example a light mast which where appropriate at its upper end comprises an arm 1a on whose end a street lamp 4 is mounted.

A device for testing the stability of the mast 1 including its anchoring 2 comprises a force unit 5 which for example can be attached to a mobile, schematically indicated vehicle 6, a force sensor 7 which is located between the force unit 5 and the mast 1, a distance sensor 8 preferably formed as a distance path sensor, which is arranged in the same vertical testing plane of the unit 5 and the force sensor 7, for example on the other side of the mast, as well as an evaluation unit 9 circuited with the force sensor and the distance sensor.

This evaluation unit comprises a computer 10, e.g. a personal computer which is connected to a monitor 11 and/or to a printer 12. Furthermore there is provided a transmitter 13 which leads the signals of the force sensor and of the distance sensor 8 in a processed form to the computer 10. The more exact construction, which is not further decisive, of the above mentioned device, may be designed as is described in DE-U-94 04 664.

The evaluation unit 9 is formed in a manner such that the compressions force measuring results as well as the tensile force measuring results in the respective testing plane and in each case with respect to the associated mast deflection are displayed. The formation of the unit thus comprises means 20 for determining loading and unloading characteristic curves. For this correspondingly programmable computer components may be applied. In a further formation of the unit 9 this may also contain electrical comparator circuits 21 so that the obtained momentary curves or characteristic curves may be automatically compared to one another in the evaluation unit. If with a comparison of the characteristic curves a deviation from one another is determined, this results in that a damage to the mast and/or its anchoring is present. The evaluated characteristic curves may be optically (symbolically or alphabetically) preferably displayed on the monitor and/or represented with the printer. Additionally to the evaluated characteristic curves also an acoustic signal may be given.

The checking of the mast and its anchoring for stability is carried out as follows.

Firsty a first vertical testing plane is selected, in which the mast 1 is loaded by way of a force which engages the mast above the mast anchoring 2 at a predetermined location, i.e is loaded with bending. Preferably such a plane is selected in which the main loading of the mast lies. At the same time preferably the loading of the mast by way of wind forces is taken into account.

In FIG. 2 with the reference numeral 14 a first vertical testing plane is indicated in which also the main loading forces act on operation of the mast. It is assumed that firstly a compression force reaching up to a predetermined, maximum test value is exerted continuously increasingly onto the mast. The distance sensor 8 which is connected onto the mast at a predetermined location above the anchoring 2 comprises with this example the lateral, distance path deflections S belonging to the corresponding pressure force FD. With this both values are simultaneously and continuously inputted to the tranmitter 13 which in turn inputs them into the computer 10 suitably prepared. This computer processes the incoming readings, according to a program, i.e. it sets them into a relationship, and specifically as a function f of the force FD in dependency on the associated mast deflection. There thus arises a momentary loading characteristic curve 16 which is to be seen on the monitor 11. Alternatively, or additionally this characteristic curve 16 may also be printed with the printer 12 connected to the computer 10 and thereby documented.

After reaching the maximum testing force in the elastic deformation region of the mast the test force further acting as a compression force is reduced il a continuously falling manner. Thereby again a characteristic curve is recorded in tile previously mentioned manner, this time however in the form of an unloading characteristic curve 17 and is displayed on the monitor 11 (indicated dashed) and/or is recorded with the printer 12. In contrast to the evaluation of the loading characteristic curve 16 the evaluation of the unloading characteristic curve 17 is effected with the help of a suitably programmed computer program in the reverse direction, i.e. proceeding from the maximum test force until a test force with the value zero, wherein the reducing mast deflection S in each case is set into relation to the reducing test load FD. According to the condition of the tested system of the mast and its anchoring the unloading characteristic curve will have the same course as the loading characteristic curve or both characteristic curves will deviate from one another. On account of the course of the two evaluated characteristic curves the testing person may already carry out an assessment of the tested system.

The values of both characteristic curves 16 and 17 may however also be automatically compared by way of comparator circuits, and the result in each case may be displayed on the monitor 11 and/or documented with the printer 12.

For the increased information ability on the stability or standing safety of the mast and/or its anchoring it is advantageous in the same vertical testing plane 14 to apply a second test force F in the opposite direction to the first test force. If the first test force is a compression force FD the second test force is a tensile force FZ which is exerted in a continuously increasing manner and subsequently in falling manner with a simultaneous measurement of the respective mast deflection. Corresponding to the above mentioned explanation again a momentary loading characteristic curve 16 and a momentary unloading characteristic curve 17 is obtained as the graphics on the monitor displays. These characteristic curves may likewise have the same gradient as the previously obtained characteristic curves, they may however also deviate from one another. Also these characteristic curves may be printed with the printer 12.

For increasing even further the information capability on the stability o the mast 1 and its anchoring the mast many be tested in at least one further vertical testing plane 19 as explained previously.

This further testing plane runs preferably at right angles to the first vertical testing plane 14. Again two momentary characteristic curves for the compression force and the tensile force application are obtained which are displayed on the monitor 11 and/or may be permanently documented with the printer 12. If the mast has been examined in both testing planes 14 and 19, then with this very good information is given with respect to the stability of the mast and its anchoring.

The characteristic curves of the diagrams in the subsequently described FIGS. 4a to 9b represent the measurement results evaluated by the evaluation unit. For the sake of simplicity the characteristic curves of these figures are to represent the results obtained in only one vertical testing plane. In this context they of course also apply to where appropriate several selected vertical testing planes.

Figure 4:
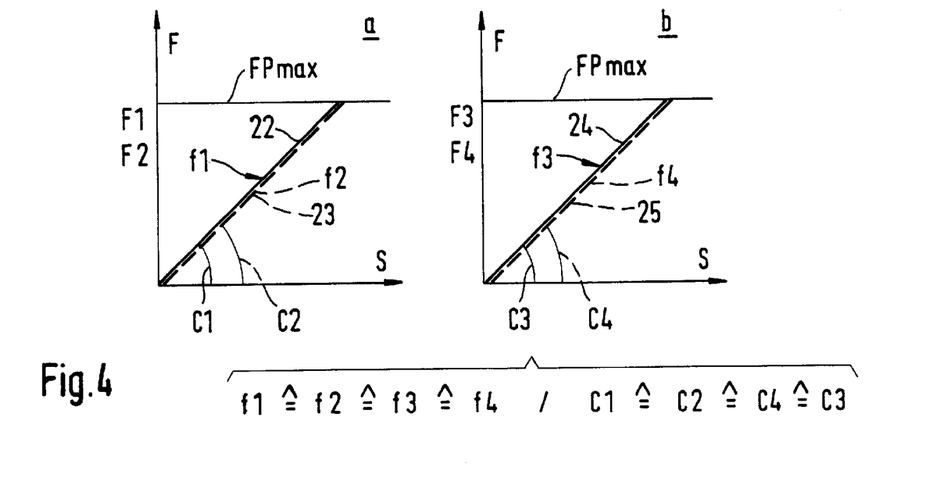

It is to be assumed that the mast 1 and its anchoring 2 firstly is loaded on bending with a compression force. One obtains according to FIG. 4a for example a momentary loading characteristic curve 22 with the course as a straight line according to the function f with the unchanging gradient C1. This characteristic curve 22 runs from the zero point in the inclined and straight shape until reaching the maximum test load FPmax. Subsequently the mast is unloaded under a constant reduction of the compression force so that an unloading characteristic curve 23 is obtained. Also this characteristic curve shown dashed runs straight, and in the case shown according to the function f2 with the unchanging gradient. This characteristic curve is evaluated as a retrograde characteristic curve, and specifically from the maximum test load FPmax back to the same zero point of the loading characteristic curve 22, so that in the present case both characteristic curves 22, 23 overlap From this test result so far it results that the anchoring 2 of the mast has not changed, i.e. has behaved ideally and that also the mast itself has no damage.

In order to ensure the result of the first testing procedure in the same testing plane it is tested with an opposite force direction. For the purpose of avoiding a conversion of the testing device the mast is loaded in bending with a tensile force. The results of this second measuring procedure are represented in FIG. 4b. One obtains firstly a loading characteristic curve 24 (solidly drawn), which has a straight course according to the function f3 with an unchanging gradient C3. After reaching the maximum test load FPmax again a continuously reducing tensile force test loading of the mast is effected until the value zero. With this there arises a straight unloading characteristic curve 25, shown dashed, according to the function f4 with an unchanging gradient C4. On recognises from FIG. 4b that the courses of the two characteristic curves 24 and 25 are identical since also in this case the straight unloading characteristic curve 25 runs back into the zero point of the loading characteristic curve 24 and with its gradient C4 corresponds to the gradient C3. The gradients C1 to C4 may be given to the monitor 11 and/or to the printer 12 in various angular degrees.

If then with the testing procedures according to the FIGS. 4a and 4b it is found out that the functions f1, f2, f3 and f4 so correspond to one another that also the respective gradients C1, C2, C3 and C4 are unchanged over the whole length of the straight characteristic curves, thus have the same value, then it follows that the whole system mast/anchoring is free of damage.

Figure 5:
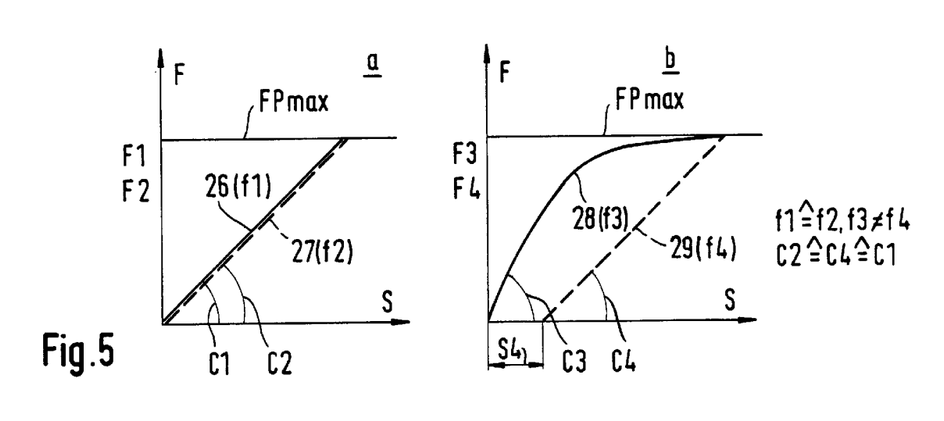

According to FIG. 5 a further mast in a vertical testing plane is tested up to a maximum testing force FPmax, and specifically it is loaded with bending firstly with a compression force, as is shown in FIG. 5a and subsequently with a tensile force, as FIG. 5b shows. One obtains also here a loading characteristic curve 26 beginning from the zero point and uniformly increasing as a function f1 of the compression force F1 in dependency on the deflection distance path S1. To this loading characteristic curve there belongs a gradient C1. After reaching the maximum test force an unloading characteristic curve 27 is recorded. Thereby the unloading function f2 is obtained, and specifically as a function of the restoring force F2 in dependency on the resulting deflection distance path S2. To this unloading characteristic curve there belongs a gradient C2. Since both characteristic curves overlap and return to the zero point, it may be concluded therefrom that the mast as well as its anchoring are in order.

There is then effected the second testing procedure in the same plane with a tensile loading. Tile result is represented in FIG. 5b. Firstly the solidly represented loading characteristic curve 28 is evaluated and specifically as a function f3 of the test force F3 in dependency on the deflection distance path S3. To this characteristic curve there belongs a gradient C3 which firstly has a step course and then a course becoming weaker. Subsequently the unloading characteristic curve 29 as a function f4 of the restoring force F4 in dependency on the reducing deflection S4 is evaluated. To the straight unloading characteristic curve 29 running back there belongs the gradient C4. One ascertains that the unloading characteristic curve 29 does not return to the zero point, but there remains a residual distance path S4.

Figure 3:
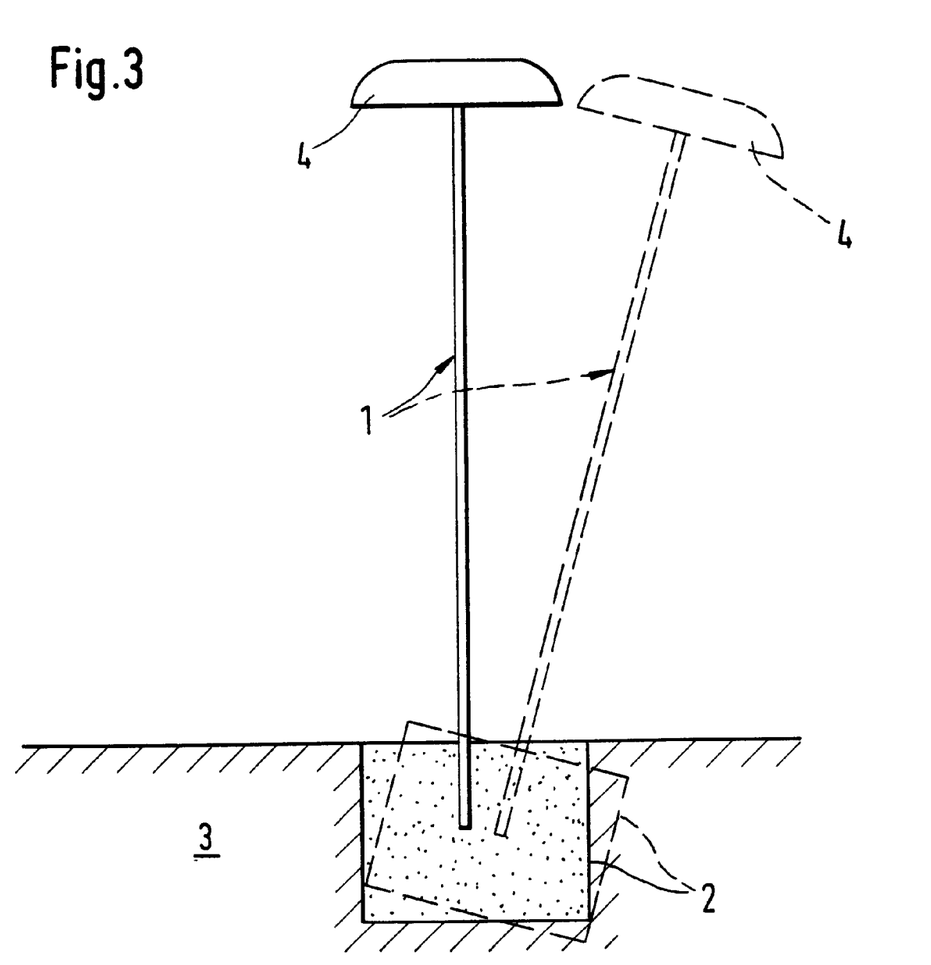

A comparison of the unloading characteristic curves 27 and 29 shows that they both have the same course and thus the same gradient over their whole course. From this it may be concluded that the mast itself is in order, thus for example has no fracture. Since however the unloading characteristic course 29 does not return to the zero point, but with a completely lifted restoring force there remains a residual distance path, it is therefore certain that the anchoring 2 of the mast 1 has been displaced in the sense of a tilting movement, as is shown dashed and exaggerated in FIG. 3. The ground surrounding the anchoring has therefore given, which is to be recognized with the loading characteristic curve 28 according to FIG. 5b in that it blends into a very flat course, i.e. with a low gradient, in its upper section. On account of the fact that with the unloading of the mast the associated unloading characteristic curve 29 with respect to its restoring deflection does not return to the zero point, the upper, very flat section of the loading characteristic curve 28 is to be evaluated as a failure of the anchoring 2. The functions f3 and f4 thus deviate from one another.

Figure 6:
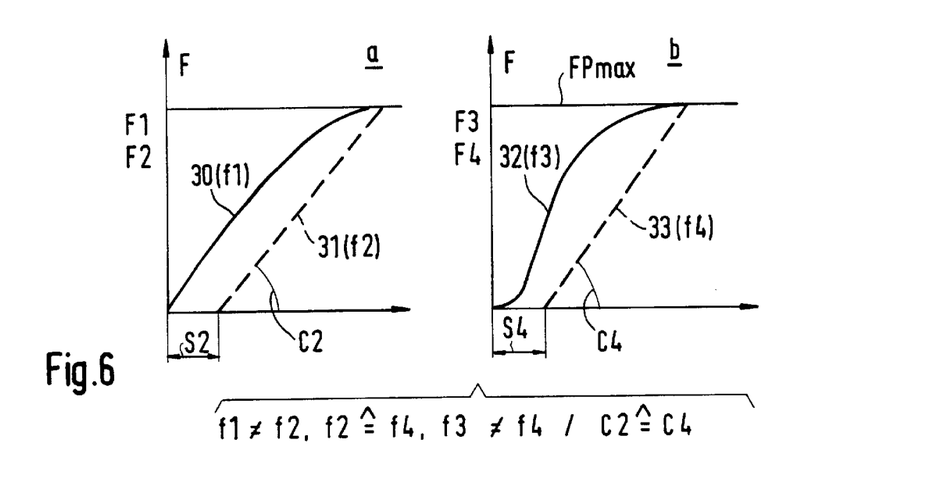

The representations according to the FIGS. 6a and 6b show the test results of a next mast and its anchoring. The courses of the testing procedures in the common testing plane are also described here as previously in combination with the FIGS. 4 and 5. One recognises in FIG. 6a that the loading characteristic curve 30 firstly takes an expected course, but then in its upper section blends into an increasingly reducing gradient. The returning unloading characteristic curve 31 is represented as a straight line, with the unchanging gradient C2. Also in this case there remains a residual deflection S2. Thus also here a tilting shifting of the mast anchoring 2 is given, somewhat comparable to the representation in FIG. 3, wherein the mast itself has no damage.

With the second testing procedure in which the mast is loaded on bending with a tensile loading, there results the diagram according to FIG. 6b. The loading characteristic curve 32 deviates considerably from a straight line, and specifically firstly it has a flat course, which after a short deflection path then blends into a steeper course and in the upper section again returns into a flatter course, until the maximum test force has been reached. The subsequent unloading of the mast resulted again in a straight-lined, unloading characteristic curve 33 which again does not return to the zero point, but leaves behind a residual deflection S4.

One recognises that the courses of the unloading curves 31 and 33 overlap so that the gradient C2 corresponds to the gradient C4. However the functions f1 and f3 deviate from the associated functions f2 and f4 from one another. From both pictures according to the FIGS. 6a and 6b it may again be concluded that with the first as well as with the second testing procedure the ground 3 has given with respect to the anchoring 2 of the mast 1, and the mast anchoring is not perfect.

Figure 7:
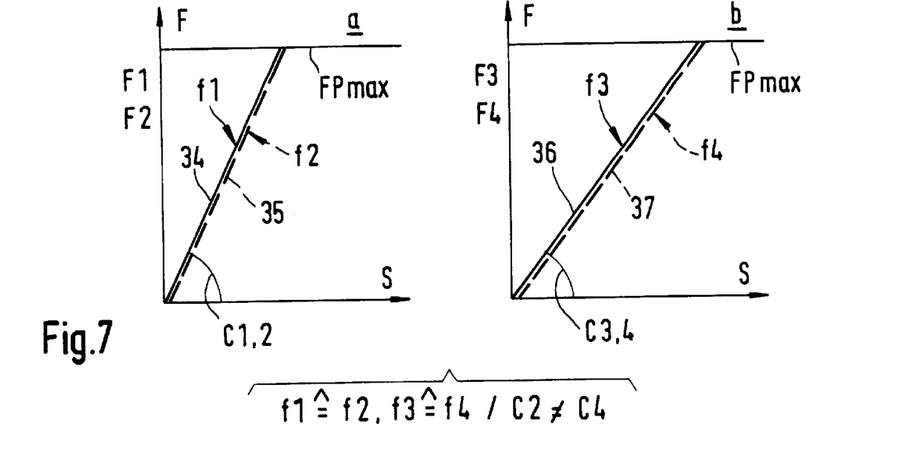

The representations according to the FIGS. 7a and 7b show the test results of a further mast and its anchoring. Also these representations are based on the previously described testing course. According to FIG. 7a there results a straight loading characteristic curve 34 running up to the maximum test load. The unloading characteristic curve 35 overlaps with the loading characteristic curve 34, so that the functions f3 and f4 including their gradient are the same. Both characteristic curves have the same zero point. Thus the mast and the anchoring are without damage.

According to FIG. 7b the loading characteristic curve 36 likewise runs straight and the unloading characteristic curve 37 again overlaps with its associated loading characteristic curve 36. Also in this case both lines over their whole length have the same gradient and additionally the same zero point.

Although in both cases no residual deflection has been ascertained, however the gradients of the first curve pair 34, 35 deviate from those of the second curve pair 36, 37, wherein the second curve pair has a lower gradient than the first pair of curves. In total from the courses of the characteristic curves according to the FIGS. 7a and 7b it may be concluded that a shifting of the mast anchoring 2 has not taken place, however that the mast has damage. The damage, for example a fracture can be recognized at the lower gradient of the curve pair 36, 37, since the mast behaves more elastically in the case of damage.

Figure 8:
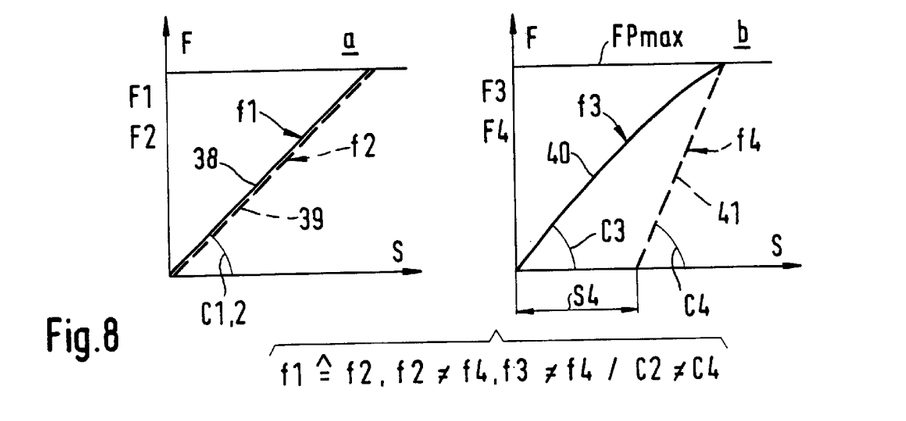

The next testing case is shown in the FIGS. 8a and 8b. Also in this case the testing procedures are effected such as they were explained in combination with the FIGS. 4 and 5. FIG. 8a shows a loading characteristic curve 38 as a straight line and an unloading characteristic curve 39 likewise as a straight line. The courses of these two characteristic curves are identical, since in each case they have the same gradient over their whole length.

FIG. 8b shows that the loading characteristic curve 40 does not have a straight course but in its gradient becomes smaller with an increasing test force. The associated unloading characteristic course 41 runs again as a straight line with an unchanging gradient C4, the unloading characteristic curve 41 does not however return to the zero point but there remains a residual deflection S4.

A comparison of the curve pairs 38, 39 and 40, 41 shows that apart from an ascertained residual deflection S4 also a different gradient of C2 and C4 thus a differing gradient of the unloading characteristic curves 39 and 41 is given. From this it is then to be concluded that the mast 1 is damaged and specifically on account of the differing gradients of C2 and C4, as well as there being present a tilting shifting of the ground anchoring 2.

Figure 9:
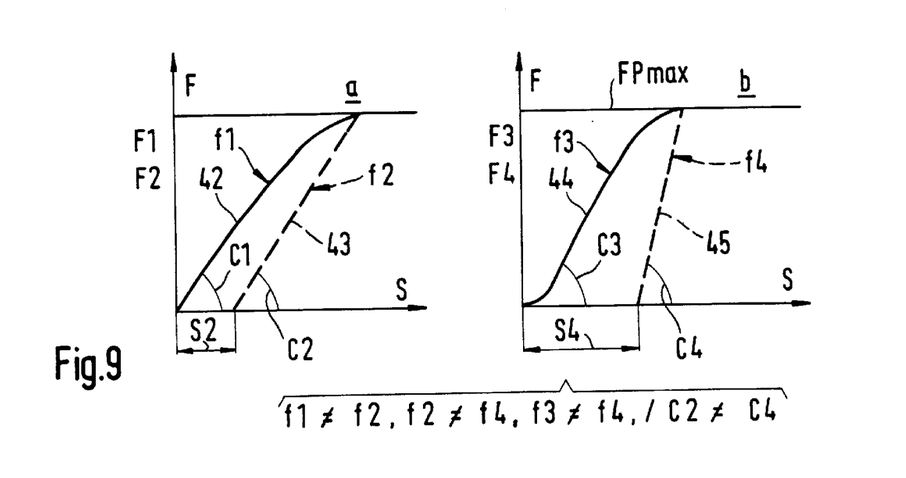

Finally there is yet another testing case shown in the FIGS. 9a and 9b. Also in this case the testing procedures are carried out as are described in combination with the FIGS. 4 and 5.

FIG. 9a shows that the loading characteristic curve 42 has a one-sided curved course, and specifically with a gradient C1 becoming smaller. The associated unloading characteristic curve 43 again has a straight course also with an unchanging gradient C2. The unloading characteristic curve 43 does not however return to the zero point, but there remains a residual deflection S2. This means that the ground anchoring 2 of the mast has given way.

FIG. 9b shows that the loading characteristic curve 44 likewise has a curved course, and specifically firstly with a flat gradient C3, which then again becomes larger, and then becomes smaller. The associated unloading characteristic curve 45 again runs as a straight line and likewise does not return to the zero point. There remains a residual deflection S4 of the mast which is larger that the firstly determined residual deflection S2. From the differing residual deflections S2 and S4 it follows that the gradient C4 of the unloading characteristic curve 45 is steeper than the unloading characteristic curve 43.

From the results of this testing case it results that the mast has a damage, for example in the form of a fracture, and that with both testing procedures there is given a tilting shifting of the mast anchoring 2.

In particular from the testing cases according to FIGS. 7, 8 and 9 it results that the gradients C2 and C4 of the functions f2 and f4 are evaluated such that a damage-free mast is present when the gradients C2 and C4 are equal and that a mast is damaged when the gradients C2 and C4 deviate from one another.

Furthermore it can be determined on which side the mast is damaged when the gradients C2 and C4 of the respective unloading characteristic curves are not equal. If the gradient C2 (compression force) is smaller than the gradient C4 (tensile force), this gives the information that a damage is present on that side of the mast on which the force F1 acted. If the gradient C2 is greater than the gradient C4, then a damage is present on that side of the mast on which the force F3 acted.

Furthermore it is possible that on testing the mast and its anchoring only the courses of the functions f2 and f4 thus the courses of the unloading characteristic curves are determined and evaluated with regard to any damage to the mast and/or tilting shifting of the system mast/anchoring.

Finally it is possible to determine the linear course of the functions f2 and f4, thus the linear course of the unloading characteristic curves by measuring two values for F2 and S2 or F4 and S4 respectively. This manner of proceeding Simplifies the evaluation of the unloading characteristic curve.

With the previously described method the presence of reference characteristic curves may be done away with. The evaluation and assessment of the unloading characteristic curves gives sufficient information that the mast and/or its anchoring is damaged, wherein the damage of the anchoring is to be understood as a change of its position in the ground.

With the previously explained examples of the suggested method it is assumed that the maximum test load FPmax is always achieved. If this is not the case which means the momentary prevailing and loading test force leads already earlier to a gradient becoming more or less continuously flat, in particular of the upper course of the respective loading characteristic curve, then in many cases it is further possible also to conclude the one or the other type of damage to the mast itself. In such cases with the unloading characteristic curves as a rule there results permanent mast deflections which may be assessed together with the courses ol tile loading characteristic curves and their end force values. This is subsequently explained in more detail in combination with the FIGS. 10 to 13.

Figure 10:
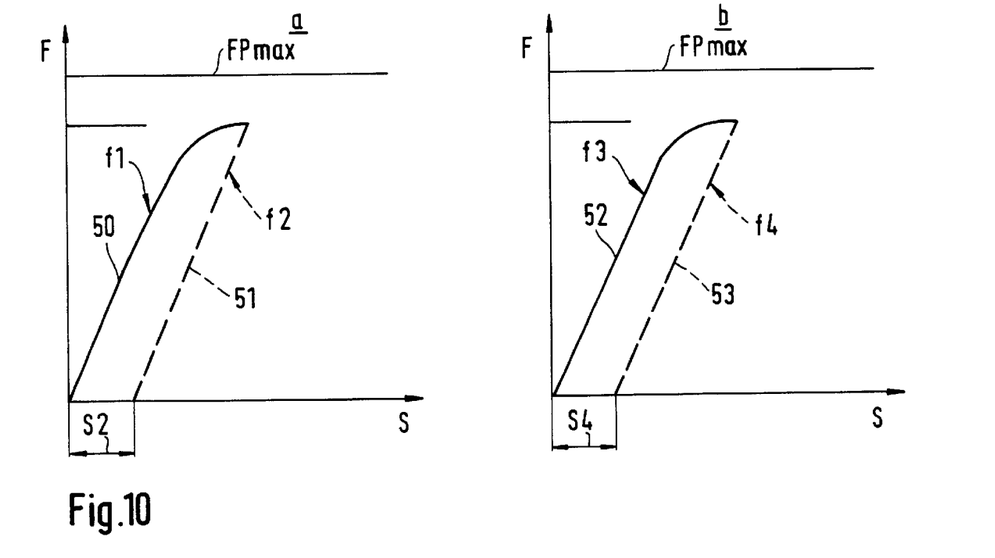

According to FIG. 10a the mast to be checked is firstly again loaded on bending with a compression force, and specifically with a constantly increasing force, so that the solidly represented loading characteristic curve 50 according to the function f1 arises. One recognises that the sought after maximum test force FPmax is not reached, but rather that the line 50 earlier in its gradient becomes more and more flat and at its upper end section blends into a curved shape. This first testing procedure is broken off at this position, and there arises on account of the still present elasticity of the mast the dashed unloading characteristic curve 51 according to the function f2. This line does not run back to the zero point, but there remains a permanent residual deflection of the mast S2, which is read off on the monitor with respect to the numbers or symbolically and/or documented with the printer.

According to FIG. 10b then the second testing procedure is carried out in which the mast is loaded on bending in the same plane with a tensile force. Also in this case there results a laoding characteristic curve 52 according to the function f3, shown solidly, wherein this line before reaching the maximum test force FPmax again in the upper section blends into a curvature becoming more flat. The unloading which is subsequent to this results in the unloading characteristic curve 53, indicated dashed, according to the function f4. Also this line does not return to the zero point, but there results a permanent mast deflection S4.

A comparison of the two pairs of characteristic curves of these figures shows that the loading characteristic curves 50, 52 from their zero point increase constantly in a straight-lined manner, curve in their upper end section equally or roughly equally becoming more and more flat, and specifically with the same or roughly same end value below the maximum test force. The unloading characteristics curves 51 and 53 likewise have the same course, and there results mast deflections remaining the same or roughly the same which are both larger than zero. The result of these two testing procedures lies in the fact that a tilting shifting of the mast anchoring is not given, but that however tile mast itself is damaged. On account of the operation up to now the mast is damaged by a corrosion procedure which with the two testing procedures has expressed itself in that during the two testing procedures a plastification of the mast in the region of the corrosion location has taken place. Essential features for this are the fact that the mast damage with the two testing procedures with the same or roughly the same momentary test force below the maximum test force becomes recognisable in combination with the permanent residual deflection.

Figure 11:
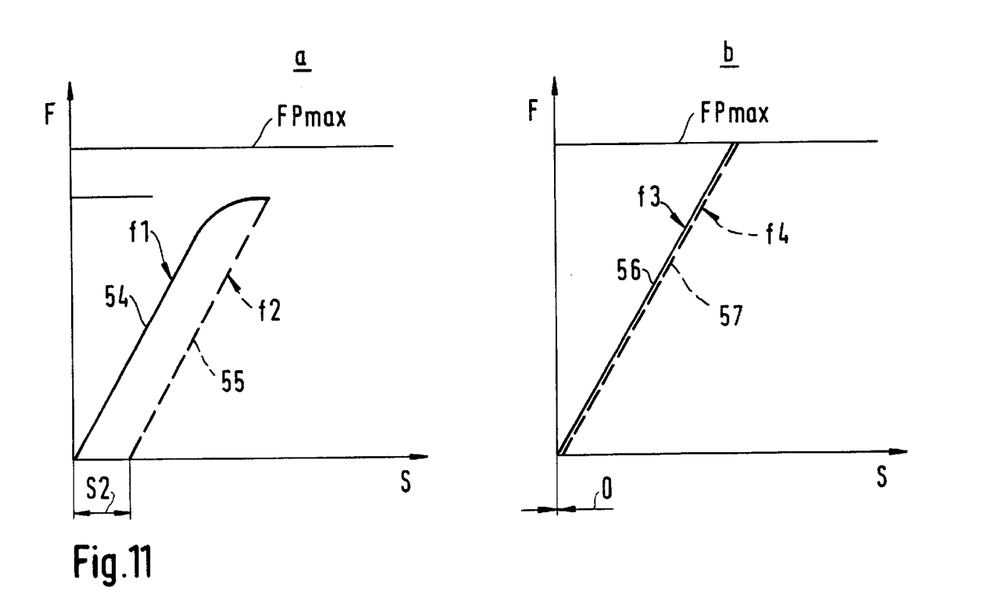

The two testing procedures in the FIGS. 11a and 11b disclose another type of damage to the tested mast. Also in this case the two testing procedures firstly compression force then tensile force are carried out as previously specified. There arises firstly a loading characteristic curve 54 according to the function f1, which in its upper end section ends with a gradient becoming flatter before reaching the maximum test force FPmax. The returning unloading characteristic curve 55 shown dashed, according to the function f2, again ends in a permanent residual deflection S2.

With the second testing procedure according to FIG. 11b there results another picture of the testing course. There firstly arises a loading characteristic curve 56 according to the function f3, which however as a whole runs straight and with which the maximum test force FPmax is reached. Since with this force the testing procedure is stopped as provided, there then arises the unloading characteristic curve 57 according to the function f4 which in this case overlaps the loading characteristic curve 56 and thus returns to the zero point, which means that there is no sort of permanent residual deflection of the mast.

Although with the second testing procedure according to FIG. 11b no sort of damage could be discovered, thus neither to the mast itself nor to its anchoring, however FIG. 11a leaves no doubt as to a damage to the mast since also here no shifting of the mast anchoring is recognisable. The damage which can be deduced as a result of these two testing procedures is a fracture in the mast, which in the first testing procedure has enlarged, essentially increased in length, and specifically to the degree that a permanent residual defletion S2 could be determined. The course of the two characteristic curves 54 and 55 as an identification as a fracture which is present in the mast and which has already weakened the mast to a high degree may be explained by FIG. 11b. Since here the test has taken place in the opposite direction and with this the two fracture halves have been pressed onto one another, the mast with the second testing procedure has behaved practically like an undamaged mast. With the testing procedure according to FIG. 11 thus likewise no shifting of the mast anchoring is given, but the mast has fracture damage.

Figure 12:
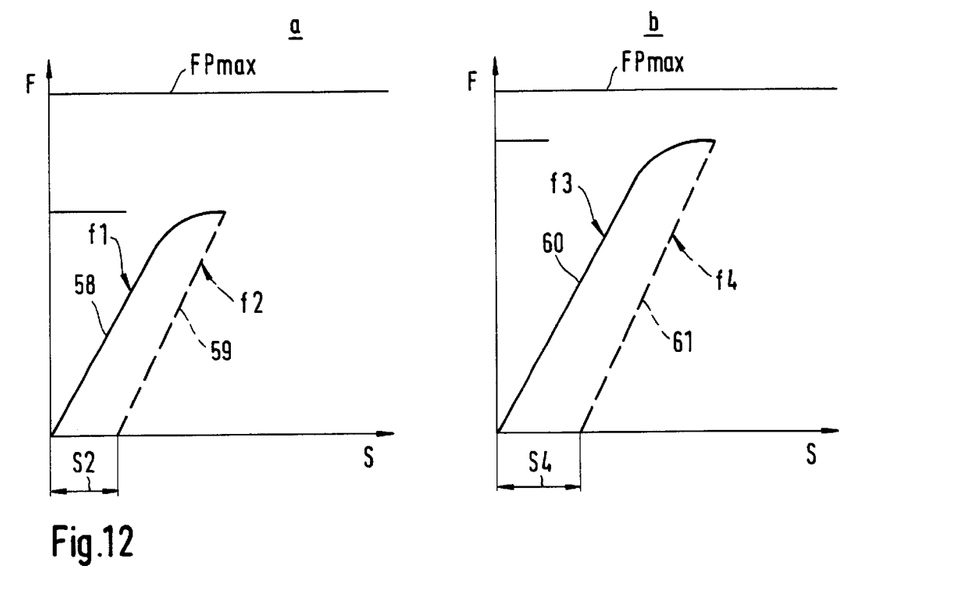

Yet a further type of damage can be deduced from the FIGS. 12a and 12b ). With the first testing procedure according to FIG. 12a (compression force) there results firstly a loading characteristic curve 59 according to the function f1, shown solidly. In its upper end region this line again blends into a curve becoming flatter with a momentary test force which likewise lies below the maximum test force FPmax. The testing procedure is again stopped, in order to avoid further damage to the mast. The then evaluated unloading characteristic curve 59 according to the function f2 runs back in a straight manner, but does not end at the zero point of the force-distance system, but leaves behind a permanent residual deflection of the mast S2. The second testing procedure in the same testing plane with an opposite test force (tensile force) firstly results in a loading characteristic curve 60 according to the function f3, which firstly rises in a straight manner and in its upper end region again before reaching the maximum test force blends into a curve becoming flatter. The testing procedure is stopped and there results a returning unloading characteristic curve 61 according to the function f4, which likewise does not return to the zero point of the force-distance system, but results in a permanent residual deflection S4 of the mast.

A comparison of the two pairs of characteristic curves of FIGS. 12a and 12b) firstly results in that the courses of the loading characteristic curves in their upper region as such are equal or essentially equal, that however in the second testing procedure a larger momentary test force was reached. Otherwise the pairs of characteristic curves 58 to 61 essentially have the same course. The further feature which has been ascertained is the fact that both unloading characteristic curves 59, 61 lead to permanent residual deflections of the mast with a stop of the testing. These results indicate a tension fracture corrosion or an intercrystaline corrosion of the mast. In the region of the fracture which with the first testing procedure has widened somewhat, during the operation of the mast a corrosion has taken place which with the second testing procedure is partly the cause of the plastification of the mast in the region of the corrosion, so that in the second testing procedure a higher momentary test force had to be applied. A shifting of the mast anchoring has not occured with these two test procedures.

Figure 13:
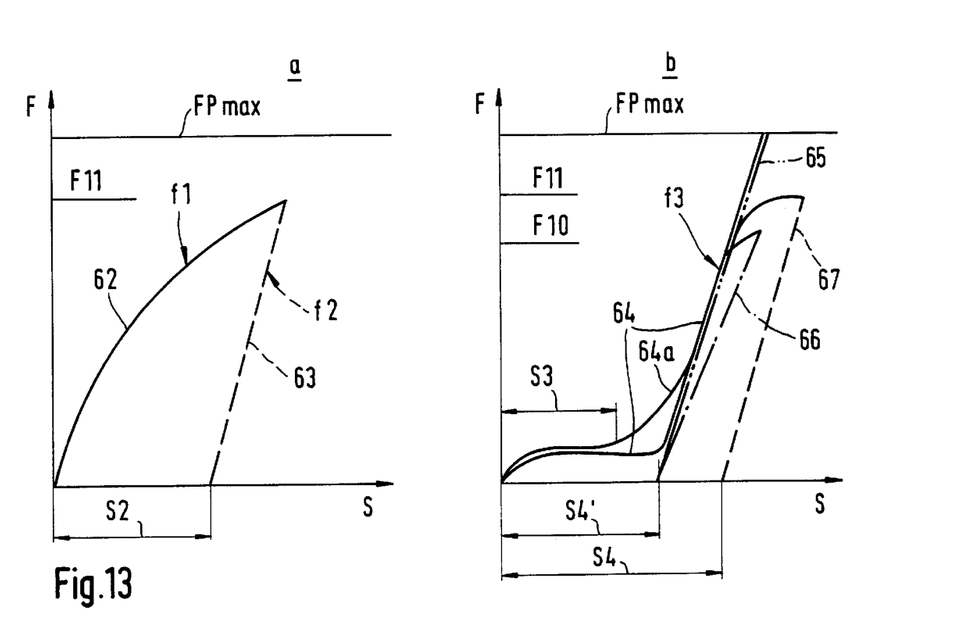

A further test result is represented in the FIGS. 13a and 13b. According to FIG. 13a there firstly results a solidly drawn loading characteristic curve 62 according to the function f1. This line 62 has for example a curved course from the beginning, which in its end region has already become relatively flat, so that the testing procedure (compression) is stopped at a momentary test force below the maximum test force FPmax. The connecting, returning unloading characteristic curve 63 shown dashed runs essentially straight and results at the end in a permanent residual deflection S2. The subsequent second testing procedure in the same testing plane, but however in the opposite direction (tensile force) results in a loading characteristic curve which firsly increases very gradually and then remains at an unchanging force value, wherein a deflection of the system mast/anchoring is to be ascertained over a certain distance. Accordingly there results a relatively steep rising of the loading characteristic curve 64.

With the rising of the loading characteristic curve 64 then various variants of this line may occur. In a first variant this line runs with a constant gradient up to tie maximum test force FPmax. There then results a returning unloading characteristic curve 65 shown with a dash double-dot line which overlaps with the course of the second section of the line 64 and thus shows a residual deflection S4'. A comparison of this result with the residual deflection S2 according to FIG. 13a means that when the deflections as here in the case shown are equal or roughly equal no damage to the mast could be ascertained, but that a shifting of the mast anchoring is present. This result also indicates that the mast itself has not experienced a plastification.

In a second variant the loading characteristic curve 64 in the upper region of its second section before reaching a maximum test force, for example the momentary test force F10, may experience a curvature becoming flatter. If the testing procedure is immediately stopped, a returning unloading characteristic curve 66 shown dot-dashed may arise, this also resulting in the previously determined residual deflection value S4'. In this case a shifting of the mast anchoring is present, wherein the mast has a fracture damage which has been ascertained in the second testing procedure but which has behaved completely elastically, because the unloading characteristic curve 66 returns to the lower end point from which the second, steeply rising section of the loading characteristic curve 64 is imagined to have began, as is deduced from FIG. 13b.

A third variant in the testing procedure results when the loading characteristic curve 64 likewise in the second section at F11 before reaching the maximum test force becomes considerably weaker. There then results a returning unloading characteristic curve 67 shown dashed, whose lower end likewise leads to a residual deflection S4. This residual deflection is however larger than the previously determined residual deflection S4'. This indicates that apart from the shifting of the mast anchoring also a damage to the mast itself in the form of a fracture lengthening during the testing is present. In these cases there results a residual deflection S4 which is larger than the residual deflection S2 determined in the first testing procedure.

A fourth variant results with the fact that the testing loading of the mast according to the line 62 up to the test force F11 has led to the fact that apart from a shifting of the mast anchoring also a damage to the mast itself has occured, which however cannot be more accurately recognized by the mast deflection S2. With the second testing procedure according to FIG. 13b there results a loading characteristic curve 64a which at its beginning runs roughly as the curve 64, but already after the deflection S3 rises steeply and then for example runs further as line 64. As an unloading line there results line 67 with the residual deflection S4. Since in this case S2>S3 and the momentary test load F11 in both testing procedures is equal or almost equal with as a whole an unequal course in particular of the loading characteristic curves, it results that S3 is characteristic for the shifting of the mast anchoring in the first testing procedure, whilst the difference of the deflections $\Delta S=S2-S3$ is typical for the permanent mast deflection on account of a plastification of the mast caused by corrosion.

If it is desired to cut off the influence of the anchoring with the testing, then the mast at its lower end may be locked, which means the end region of the mast, which borders the anchoring, is connected to a mechanical means and by way of this is stabilized so that the anchoring is unmovable. Then only the bending deflection of the mast alone is acquired and evaluated with respect to the technical measurement. Also in this case the respective unloading characteristic curve is compared to the associated loading characteristic curve and the result evaluated as to the degree of damage to the mast. Finally it must be stressed that the arising deflections of the system mast/anchoring may also be determined by way of angular sensors and accordingly evaluated in the evaluation unit 9.

What is claimed is:

1. A method for testing the stability of a vertically anchored mast, with which the mast is loaded with an increasing force F1 introduced about an anchoring of the mast, wherein this force and a measure S1 about which the mast on account of the force effect is laterally deflected in one direction, where appropriate are acquired and there results a function f1=F1(S1), and with which the mast after completion of the loading procedure is again unloaded, wherein a restoring force F2 of the mast, reducing with the unloading procedure is acquired in dependency on reducing lateral deflection S2 as a restoring movement, wherein there results a function f2=F2(S2), and wherein a course of said function f1 and of said function f2 are used to provide information on a stability of the mast and said anchoring is obtained.

2. A method according to claim 1 wherein
   a. evaluating courses of the functions f1 and f2 corresponding to one another as a criterion for said mast free of damage in the testing plan and said anchoring and
   b. evaluating courses of these functions not corresponding to one another as a criterion for a tilting shifting of the mast in the region of said anchoring occurring with the loading procedure or for a damage to the mast and a tilting shifting of said anchoring.

3. A method according to claim 1 or 2, wherein the force F1 is introduced into the mast increasing linearly and wherein the function f1 and f2 have gradients C1 and C2, respectively; said method further comprising:
   a. evaluating an agreement of gradients C1 and C2 and of the linear courses of the functions f1 and f2, which relate to the same zero point as a criterion for a mast free of damage and
   b. evaluating a course of said restoring force F2 not returning back to the zero point of the force F1 as a criterion for the mentioned shifting of the mast.

4. A method according to claim 1, with which the mast after a first testing procedure in the same testing plane with a second testing procedure is loaded with a force F3 directed oppositely to the force F1 and this force as well as a lateral deflection S3 of the mast resulting with the second testing procedure are acquired, wherein there results a function f3=F3(S3), wherein also in the second testing procedure an unloading of the mast is included in that a restoring force F4 resulting with this unloading and a reducing deflection S4 of the mast are acquired, wherein there results a function f4=F4(S4) with a gradient C4, and wherein the following functional relationships are evaluated as the following information, wherein "tilting shifting" means a change in location of the mast or said anchoring on or in the ground,

| functional relationship | information |
| --- | --- |
| F1 ≅ F2 ≅ F3 ≅ F4<br>C1 ≅ C2 ≅ C3 ≅ C4 | no damage to the mast and no tilting shifting of said anchoring |
| f1 ≅ f2, f3 ≠ f4,<br>C2 ≅ C4 ≅ C1 | no damage to the mast but shifting with the second testing procedure, |
| f1 ≠ f2, f2 ≅ f4, f3 ≠ f4<br>C2 = C4 | no damage to the mast, but shifting on the first and second testing procedure, |
| f1 ≅ f2, f3 ≅ f4<br>C2 ≠ C4 | damage to the mast, but a shifting |
| f1 ≅ f2, f2 ≠ f4, f3 ≠ f4<br>C2 ≠ C4 | damage to the mast and a shifting with the second testing procedure and |
| f1 ≠ f2, f2 ≠ f4, f3 ≠ f4<br>C2 ≠ C4 | damage to the mast and shifting with the two testing procedures. |

5. A method according to claim 4, wherein the gradients C2 and C4 of the functions f2 and f4 are evaluated such that a relationship C2≅C4 is assessed as information of a mast free of damage and a relationship C2≠C4 is assessed as information of a damaged mast.

6. A method according to claim 5, wherein on ascertaining the relationship C2≠C4 the side of the mast is evaluated on which the mast is damaged, wherein a relationship C2<C4 gives information that damage is present on the mast side on which the force F1 acted, and a relationship C2>C4 indicates that damage lies ton the side on which the force F3 was effected.

7. A method according to claim 4, wherein only the courses of the functions f2 and f4 are determined and are evaluated with regard to any mast damage and/or shifting.

8. A method according to claim 4, wherein the linear course of the function f2 and f4 is determined by measuring at least two values in each case or F2 and S2 and for F4 and S4 respectively.

9. A method according to claim 1, in which the mast after a first testing procedure in the same testing plane with a second testing procedure is loaded with a force F3 directed oppositely to the force F1 and this force as well as the lateral deflection S3 of the mast resulting with the second testing procedure are acquired, wherein there results a function f3=F3(S3), wherein also in the second testing procedure an unloading of the mast is included in that the restoring force F4 resulting with this unloading and the reducing deflection S4 of the mast are acquired, wherein there results a function f4–F4(S4), wherein the first and the second testing procedure in the case of not reaching the maximum test force (Fpmax) the course and the end values of loading characteristic curves (50, 52) as well as the residual deflections (S2, S4) of evaluated unloading characteristic curves (51, 53) are acquired and evaluated for determining the type of damage to the mast.

10. A method according to claim 9, wherein the following results are evaluated as the following information, wherein "tilting shifting" means a change in location of the mast or said anchoring on or in the ground:

| result | information |
| --- | --- |
| a) S2 > 0, S4 > 0<br>characteristic curve course equal whose end force values are equal | no tilting, shifting, but a plastification of the mast in both testing procedures |
| b) S2 > 0, S4 = 0/S2 = 0, S4 > 0<br>characteristic curve course unequal, the reaching of FPmax in a testing procedure | no tilting shifting but a fracture lengthened on testing |
| c) S2 > 0, S4 > 0<br>characteristic curve course above unequal, end force value in the 2nd testing procedure higher | no tilting shifting, but tension fracture corrosion or intercrystalline corrosion in the mast |
| d) S2 = S4'<br>as a whole an unequal characteristic curve course, | only tilting shifting in 1st testing procedure, no plastification of the mast |

-continued

| result | information |
|---|---|
| 2nd loading curve beginning very flatly and steeply rising at S4' until FPmax | |
| e) S2 S4 as a whole an unequal loading course, 2nd loading curve beginning very flat and steeply rising at S4' | tilting shifting in the 1st testing procedure, fracture curve lengthening with the 2nd testing procedure |
| f) S2 > S3 as a whole an unequal loading curve course, 2nd loading curve beginning very flatly and at S3 increasing heavily, testing forces equal with both testing procedures. | tilting shifting and plastification of the mast with the 1st testing procedure |

11. A device for testing the stability of vertically anchored masts with a force unit with which bending forces F, which increase and can be acquired with a force sensor, can be introduced into the mast above an anchoring of said mast, in order to load and again unload the mast with bending moments, and with a sensor which can be brought to bear against the mast for measuring the lateral deflection S of the mast occurring on account of the bending moments, wherein the readings, produced by the sensors, for the force F and the deflection S can be simultaneously processed in an evaluation unit in relation to the functions f=F(S) or f=S(F), and specifically separately according to the courses of the function f1 for a first bending loading case and f2 for at least a further testing procedure, wherein the evaluation unit is equipped with means for determining an unloading characteristic curve which belongs to the evaluated loading characteristic curve according to the function f1 and which represents a function f2 from the restoring values (F2, S2) measured by the sensors.

12. A device according to claim 11, wherein the evaluation unit is provided with means for comparing the courses of the functions f1 and f2 for the purpose of determining a deviation of the two characteristic curves from one another as a criterion for a damage to at least one of the mast or said anchoring.

13. A device according to claim 11, wherein the functions of the loading characteristic curves can be represented optically together on a monitor connected to the evaluation unit.

14. A device according to claim 11, wherein the functions of the loading characteristic curves and unloading characteristic curves can be documented together with a printer connected to the evaluation unit.

15. The process for testing the strength of a vertically anchored mast, comprising the steps of:
   a) loading a section of the mast above an anchorage of the mast with an increasing force F1 in a first direction, wherein increasing values of said force F1 and second increasing values of a lateral displacement S1 of a section of the mast in said first direction due to the force F1 are acquired and processed to provide a function f1=f(F1, S1); and
   b) after step a), the mast is steadily relieved of load and decreasing values of a readjusting force F2 of the mast, which decrease during the relieving of the load, and a second reducing values of said lateral displacement S2 of the section of the mast are acquired and processed to provide a function f2=f(F2, S2);
      wherein said functions f1 and f2 are used to determine a strength of at least one of the mast or its anchorage.

16. The process according to claim 15, wherein said process further comprises the steps of:
   evaluating courses of functions f1 and f2 that substantially correspond to one another as a criterion for proving said mast and said anchorage free of damage; and
   evaluating courses of the functions f1 and f2 not corresponding to one another as a criterion for tilting of said mast in the region of said anchorage occurring during the loading process or for damage to said mast and said tilting of said anchorage.

17. The process according to claim 15 wherein the force F1 introduced into a section of said mast linearly increases and wherein said process comprises the steps of:
   evaluating consistency of gradients C1 and C2 of linear courses of functions f1 and f2, returning to a common zero point, as a criterion for said mast that is damage free; and
   evaluating force F2 when F2 does not return to said common zero point of force F1 as a criterion for tilting of the mast.

18. The process according to claim 15 wherein said force F1 causes said mast to move in a testing plane and after steps a) and b), the process further comprises the following steps:
   c) loading said section of said mast in said testing plane with an increasing force F3 in a direction opposite to the force F1, wherein third increasing values of the force F3 and fourth increasing values of a lateral displacement S3 of said mast section due to the force F3 are acquired and processed to provide a function f3=f(F3, S3); and
   d) after step c), steadily relieving said mast of a load and the third values of a readjusting force F4 of said mast, which decrease during the relieving of said load, and the fourth reducing values of the displacement S4 of the section of said mast are acquired and processed to provide a function f4=f(F4, S4);
      wherein the functions f1, f2, f3 and f4 have gradients C1, C2, C3 and C4, respectively, and the following functional relationships are evaluated as the following statements, where "tilting" signifies a tilting of said mast or said mast anchorage on or in the ground:

| Functional relationship | Statement |
|---|---|
| f1 ≅ f2 ≅ f3 ≅ f4<br>C1 ≅ C2 ≅ C3 ≅ C4 | no damage to the mast and no tilting of its anchorage |
| f1 ≅ f2, f3 ≠ f4<br>C2 ≅ C4 ≅ C1 | no damage to the mast, but tilting in step c) |
| f1 ≠ f2, f2 ≅ f4, f3 ≠ f4<br>C2 ≅ C4 | no damage to the mast, but tilting in both steps a) and c) |
| f1 ≅ f2, f3 ≅ f4<br>C2 ≠ C4 | damage to the mast, but no tilting |
| f1 ≅ f2, f2 ≠ f4, f3 ≠ f4<br>C2 ≠ C4 | damage to the mast and tilting in step c) |
| f1 ≠ f2, f2 ≠ f4, f3 ≠ f4<br>C2 ≠ C4 | damage to the mast and tilting in both steps a) and c). |

19. The process according to claim 18, wherein a relationship C2≅C4 is evaluated as a criterion of a damage-free mast and a relationship C2≠C4 is evaluated as a criterion of a damaged mast.

20. The process according to claim 19, wherein if C2≠C4, a relationship C2<C4 is evaluated as a criterion that there is damage on the side of the mast on which force F1 was acting and a relationship C2>C4 is evaluated as a criterion that there is damage on the side of the mast on which the force F3 was acting.

21. The process according to claim 18 wherein only the courses of functions f2 and f4 are used to evaluate at least one of mast damage or tilting.

22. The process according to claim 18 wherein the linear course of function f2 or f4 is determined by measuring at least two values for F2 and S2 or for F4 and S4, respectively.

23. The process according to claim 15 wherein said force F1 causes said mast to move in a testing plane and after steps a) and b), the process further comprises the following steps:

c) loading said section of said mast in said testing plane as the force F1 with an increasing force F3 in a direction opposite to said force F1, wherein fifth increasing values of the force F3 and fifth increasing values of the lateral displacement S3 of said mast section due to the force F3 are acquired and processed to provide a function f3=f(F3,S3); and d) after said step (c), said mast is steadily relieved of load and the fifth readjusting values of a readjusting force F4 of the mast, which decrease during the relieving of the load, and the fifth reducing values of the displacement S4 of the section of said mast are acquired and processed, resulting in a function f4=f(F4,S4);

wherein in steps a) to d), in the event of a maximum testing force Fpmax not being reached, the course of functions f1 and f3, the final force values of F1 and F3, and the final displacement values of S2 and S4, are used to evaluate the type of damage to the mast.

24. The process according to claim 23, wherein the following results are evaluated as the following statements, wherein "tilting shifting" signifies a tilting in of the mast or its anchorage on or in the ground:

| Result | Statement |
| --- | --- |
| S2 > 0, S4 > 0 f1 = f3, final force values F1 and F3 substantially equal | no tilting, but plasticising of the mast in both steps a) and c) |
| S2 > 0, S4 = 0 OR S2 = 0, S4 > 0 f1 ≠ f3, Fpmax reached in step a) or step b) | no tilting, but elongated cracking on testing |
| S2 > 0, S4 > 0 f1 and f3 unequal at the top, final force value of F1 < final force value of F3 | no tilting, but stress cracking corrosion or intercrystalline corrosion in the mast |
| S2 = S4' f1 and f3 unequal as a whole, f3 beginning very flat and at a displacement value S4' rising steeply to Fpmax | tilting only in step a), no plasticizing of the mast |
| S2 S4 | tilting in step a), elongation |
| f1 and f3 unequal as a whole, f3 beginning very flat and at a displacement value S4' rising steeply | of cracking in step c) |
| f) S2 > S3 f1 and f3 unequal as a whole, f3 beginning very flat and rising sharply at a displacement value S3, final force values of F1 and F3 substantially equal. | tilting and plasticising of the mast in step a). |

25. A device for testing the strength of vertically anchored masts, the device including:

a) a force unit for introducing an increasing force into a section of the mast above its anchorage and for steadily relieving the force;

b) a force sensor for acquiring the increasing values of the force F1 and the decreasing values of the force F2 introduced by said force unit;

c) a displacement sensor for abutting against said section of said mast for acquiring the increasing values of a lateral displacement S1 of said mast section due to the increasing force F1 and said decreasing values of said lateral displacement S2 of said mast section due to the decreasing force F2; and d) an evaluation unit for processing the measured values of F1, F2, S1 and S2, resulting in functions f1 =(F1, S) and f2=(F2, S2).

26. The device according to claim 25, wherein the evaluation unit is provided with means for comparing courses of functions f1 and f2 for the purpose of establishing a divergence of said functions from one another as a criterion for damage to the mast.

27. The device according to claim 25, wherein the evaluation unit is provided with means for comparing courses of functions f1 and f2 for the purpose of establishing a divergence of the two functions from one another as a criterion for damage to the anchorage of the mast.

28. The device according to claim 25, further comprising a monitor connected to said evaluation unit for displaying the plots of functions f1 and f2.

29. The device according to claim 25 further comprising a printer connected to said evaluation unit for printing the plots of functions f1 and f2.

* * * * *